(12) United States Patent
Fergani et al.

(10) Patent No.: US 12,403,656 B2
(45) Date of Patent: Sep. 2, 2025

(54) METHOD FOR HEATING A BASE MATERIAL IN ADDITIVE MANUFACTURING

(71) Applicant: Siemens Energy Global GmbH & Co. KG, Bayern (DE)

(72) Inventors: Omar Fergani, Berlin (DE); Ole Geisen, Berlin (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 158 days.

(21) Appl. No.: 17/434,750

(22) PCT Filed: Feb. 18, 2020

(86) PCT No.: PCT/EP2020/054199
§ 371 (c)(1),
(2) Date: Aug. 29, 2021

(87) PCT Pub. No.: WO2020/178020
PCT Pub. Date: Sep. 10, 2020

(65) Prior Publication Data
US 2022/0168961 A1   Jun. 2, 2022

(30) Foreign Application Priority Data
Mar. 5, 2019   (EP) ..................................... 19160711

(51) Int. Cl.
*B29C 64/295*   (2017.01)
*B22F 10/28*    (2021.01)
(Continued)

(52) U.S. Cl.
CPC ............ *B29C 64/295* (2017.08); *B22F 10/28* (2021.01); *B22F 10/36* (2021.01); *B22F 10/366* (2021.01);
(Continued)

(58) Field of Classification Search
None
See application file for complete search history.

(56) References Cited

U.S. PATENT DOCUMENTS 5,776,409 A      7/1998   Almquist et al.
2006/0228248 A1* 10/2006  Larsson ................ B29C 64/153
                                                      219/121.85
(Continued)

FOREIGN PATENT DOCUMENTS

EP    2601006 B1   6/2014
EP    3388907 A1   10/2018
(Continued)

OTHER PUBLICATIONS

PCT International Search Report and Written Opinion of International Searching Authority mailed May 8, 2020 corresponding to PCT International Application No. PCT/EP2020/054199 filed Feb. 18, 2020.

*Primary Examiner* — Michael M. Robinson
(74) *Attorney, Agent, or Firm* — Wolter Van Dyke Davis, PLLC

(57) ABSTRACT

A method for heating a base material in additive manufacturing includes a) providing an energy beam for the heating of the base material, wherein the base material is arranged to at least partly form a manufacturing plane, and b) irradiating the manufacturing plane for the heating with the energy beam under scaled irradiation parameters, wherein the scaled irradiation parameters are derived in that irradiation parameters for fusing the base material are scaled by a scaling factor, and wherein the scaling factor includes a quotient of a heating beam diameter and a fusion beam diameter.

19 Claims, 4 Drawing Sheets

(51) Int. Cl.
  *B22F 10/36* (2021.01)
  *B22F 10/362* (2021.01)
  *B22F 10/364* (2021.01)
  *B22F 10/366* (2021.01)
  *B29C 64/268* (2017.01)
  *B29C 64/393* (2017.01)
  *B33Y 10/00* (2015.01)
  *B33Y 30/00* (2015.01)
  *B33Y 50/02* (2015.01)

(52) U.S. Cl.
  CPC .......... *B29C 64/268* (2017.08); *B29C 64/393* (2017.08); *B33Y 10/00* (2014.12); *B22F 10/362* (2021.01); *B22F 10/364* (2021.01); *B33Y 30/00* (2014.12); *B33Y 50/02* (2014.12)

(56) References Cited

U.S. PATENT DOCUMENTS

| | | |
|---|---|---|
| 2010/0007062 A1 | 1/2010 | Larsson |
| 2018/0193953 A1* | 7/2018 | Boswell ................ B23K 26/34 |
| 2018/0214950 A1* | 8/2018 | Karlsen ................ B23K 26/342 |
| 2018/0264598 A1* | 9/2018 | Mamrak ............... B29C 64/393 |
| 2018/0304406 A1 | 10/2018 | Roerig |

FOREIGN PATENT DOCUMENTS

| | | |
|---|---|---|
| WO | 2013092994 A1 | 6/2013 |
| WO | 2018189301 A1 | 10/2018 |
| WO | 2019005602 A1 | 1/2019 |

* cited by examiner $$S \sim \frac{D_h}{D_f}$$

METHOD FOR HEATING A BASE MATERIAL IN ADDITIVE MANUFACTURING

CROSS REFERENCE TO RELATED APPLICATIONS

This application is the U.S. National Stage of International Application No. PCT/EP2020/054199 filed 18 Feb. 2020, and claims the benefit thereof. The International Application claims the benefit of European Application No. EP19160711 filed 5 Mar. 2019. All of the applications are incorporated by reference herein in their entirety.

FIELD OF INVENTION

The present invention relates to a method for heating, advantageously pre-heating or post-heating, a base material for the additive manufacture of a component. Further, an according additive manufacturing method is provided. Furthermore, a method of providing an irradiation pattern, and a corresponding computer program or computer program product are provided.

Preferably, the component denotes a component applied in a turbo machine, e.g. in the flow path hardware of a gas turbine. The component and/or the base material is advantageously made of a nickel- or cobalt-based superalloy, particularly a precipitation hardened alloy.

BACKGROUND OF INVENTION

Turbo machines, particularly those for power generation purposes, are subject to steady development in order to increase efficiency. This development is actually gaining significance in view of restrictions which are to be implemented to comply with climate change and global warming mitigation. Further progress in turbine efficiency is e.g. complicated as operation temperatures of the hot gas path of gas turbines, would yet have to be increased. At the same time there is a stringent demand to apply the turbo machines in a less steady operational mode, e.g. on demand in peaker plants when there is a high demand for electricity, for example. This poses significant challenges particularly for the materials applied in the given machines, as for example the discontinuous (on demand) use highly increases material fatigue due to the involved warming and cooling cycles and therewith the number of the so-called "equivalent operating hours". Thermo-mechanical fatigue and creep behaviour are here the dominant issues which pose the main challenges for the turbo machine materials.

Additive manufacturing, particularly powder-bed-fusion (PBF) methods, such as selective laser melting (SLM), selective laser sintering (SLS) or electron beam melting (EBM) have proven to be useful and advantageous in the fabrication of prototypes or complex components, such as components with a mazelike or convoluted structure or functionally cooled components. Further, the additive manufacture stands out for its short chain of process steps which in turn enables material economization and a particularly low lead time.

A method of selective laser melting is described in EP 2 601 006 B1, for example.

The given approaches are suitable for fabricating, prototyping or manufacturing parts or components of complex shapes from a, advantageously powdery, base material with a huge freedom of design.

Apparatuses or devices for such PBF-methods usually comprise a manufacturing or build platform on which the component is built layer-by-layer after the feeding of a layer of base material which may then be melted, e.g. by an energy beam, such as a laser, and subsequently solidified. The layer thickness is determined by a recoater or deposition apparatus that moves, e.g. automatically, over the powder bed and removes excess material from a manufacturing plane or build space. Typical layer thicknesses amount to between 20 µm and 40 µm. During the manufacture, said energy beam scans over the surface and melts the powder on selected areas which may be predetermined by a CAD-file according to the geometry of the component to be manufactured. Said scanning or irradiation is advantageously carried out in a computer-implemented way or via computer aided means, such as computer-aided-manufacturing (CAM) instructions, which may be present in the form of a dataset. Said dataset or CAM-file may be or refer to a computer program or computer program product.

A computer program (product) as referred to herein may relate to a computer program means constituting or comprising a storage medium like a memory card, a USB-stick, a CD-ROM, a DVD or a file downloaded or downloadable from a server or network. Such program or product may also be provided by a wireless communication network or via transfer of the corresponding information by the given computer program (product) or computer program means.

The information or data defined e.g. defined by said computer program product or CAM-file advantageously relates to a tool path or irradiation pattern according to which an additive manufacturing processor or device may perform or execute the irradiation. Said irradiation may pertain to a pre-heating, post-heating and, of course, as well to the actual solidification of the base material for the component.

The term "pre-heating" as referred to herein shall mean that the base material for the component is only prepared or heated for the actual subsequent solidification step, e.g. in order to avoid excessive thermal gradients during the melting/welding process. This may also be expedient for each layer of the component in order to limit thermal gradients in the additive process which may otherwise easily exceed $10^5$ K/s.

Conventionally, such pre-heating may be carried out via a laser or electron beam of the corresponding manufacturing device, wherein this beam is scanned over the base material or manufacturing plane in a defocused way. Alternatively, induction coils can be conducted for the preheating of the base material.

The term "post-heating" as referred to herein shall denote a process which is advantageously carried out after a solidification of the base material has already occurred and a structure for the component is established. Besides the limitation of thermal gradients, post-heating may be very helpful for mitigating or healing defects in the component's structure. It is apparent that the post-heating relates to the already solidified structure of the component formed of the base material, rather than to the base material in the loose or powdery state.

The mentioned thermal gradients are of course adverse for the resulting material structure and chemistry in terms of weld cracks and e.g. disproportionation of chemical constituents in the hardened and specialized alloys of the base materials.

In the face of industrialised additive manufacturing processes for complex shaped components, there is the stringent need to improve not only the actual solidification or welding process, but also to further develop preparation steps, such as pre-heating and/or post-heating in a reliable and as possible automated way.

SUMMARY OF INVENTION

It is, thus, an object of the present invention to provide means which help to solve the given problems or tasks, particularly to provide for a solution to scale or tailor a heating process in an expedient way, e.g. with respect to a subsequent or prior fusion step.

The mentioned object is achieved by the subject-matters of the independent claims. Advantageous embodiments are subject-matter of the dependent claims.

An aspect of the present invention relates to a method, such as an irradiation method for heating, such as pre- and/or post-heating, of the base material in additive manufacturing.

The method comprises providing an energy beam, such as a laser or electron beam, for the heating of the base material, wherein the base material is arranged to at least partly form a manufacturing plane. Accordingly, said manufacturing plane is, advantageously, at least partly formed of the base material. Additionally, said manufacturing plane may at least partly be formed by an already solidified portion or structure of the component. In an initial state of the additive build-up process of the component, the manufacturing plane may even be formed by an underlying build plate.

The method further comprises irradiating the manufacturing plane, such as exposing the manufacturing plane for the heating with the energy beam under scaled irradiation parameters. In other words, the energy beam may be scanned over the manufacturing plane for heating purposes or may be exposed with the energy beam in an according way.

The scaled irradiation parameters are derived or rendered in that irradiation parameters for fusing the base material, e.g. for the solidification or the buildup of the component, are scaled, such as multiplied, by a scaling factor. The irradiation parameters for fusing may pertain to a conventional or known parameter set or irradiation pattern. To this effect said (given) irradiation pattern may be copied into a processor or processed in that the scaling factor is applied accordingly.

The scaling factor comprises a quotient of a heating beam diameter and a fusion beam diameter.

Said fusion beam diameter and/or said heating beam diameter, advantageously both, pertain to the energy beam. Further, both diameters advantageously constitute characteristic, specific or preset values.

The irradiation is, advantageously, carried out according to an irradiation pattern. Said pattern may be predefined or the result of a CAM-file.

It is likely or advantageous that the energy beam diameter in a heating mode (heating beam diameter) shall be or is usually chosen to be greater than the energy beam diameter in a fusion mode (fusion beam diameter), as the fusion or melting of the base material usually requires a greater spatial resolution; whereas for the heating—such as a pre-heating—the spatial energy density to be applied to the manufacturing plane shall be smaller. Further, the heating is desired to be carried out more efficiently or in a shorter time.

The present solution provides an automated, scaled and/or tailored heating procedure applicable for any component which is promising to be manufactured additively, wherein, the pre-heating is e.g. correlated with a given irradiation parameter set for the actual fusing process. Thus, important technical improvements are provided for the industrialisation and automation of additive manufacturing as a whole, without the need to individually adapt a heating strategy in a time-consuming and/or manually way, e.g. prior to any given build job.

The present invention is particularly important for high-performance materials, which require sophisticated thermal management prior to, during and/or after the respective additive buildup in order to provide the required structural or thermo-mechanical properties.

In an embodiment, the irradiation parameters for fusing at least comprise a hatch distance and a stripe width for the irradiation, wherein said hatch distance and/or said stripe width are scaled by the scaling factor. Additionally or alternatively, further parameters, such as a beam offset, or further irradiation parameters as listed herein below may be scaled by the scaling factor.

In an embodiment, the scaling factor amounts to values between 1 and 10.

In an embodiment, the scaling factor amounts to values between 2 and 5.

In an embodiment, a beam offset is defined for the irradiation and/or the heating which is chosen to about half of the heating beam diameter or a defocused beam diameter. According to this embodiment, the beam offset may not only be defined for the actual fusing, but also for any heating, such as a pre- or post-heating process. Thereby, accuracy and reproducibility of the manufacturing process can be improved as a whole, particularly in the manufacture of thermally or mechanically heavily stressed components for gas turbines. Particularly, the definition of the beam offset allows to provide and/or improve a contour irradiation strategy or corresponding heating cycles applied to the contour of the component.

In an embodiment, an idle or spare mode operation is selected for (vector) turns in the irradiation pattern resulting from the irradiation of the manufacturing plane. According to this embodiment, heat applied by the energy beam can advantegeously be controlled such that it does not exceed a maximum or upper limit above which heat may e.g. cause irreversible structural defects. Of course the vector turns in the irradiation pattern are particularly prone to such defects because the heat applied to these sites (turns between two hatching vectors) is increased due to an increased energy density, a given area of the base material is exposed to through the beam turn. For instance, such excessive heat input may result in an adverse material structure, e.g. pores. Nevertheless, an insufficient heat input may as well result in adverse material properties, such as un-melted regions.

In an embodiment the irradiation power or power density is reduced to 0 (zero) for regions or areas of the turns in the irradiation pattern only.

In an embodiment the irradiation power or power density is reduced to a lower value for regions or areas of the turns in the irradiation pattern only.

In an embodiment, the irradiation power or power density and/or an idle time for the heating is selected based on data, information or input from a thermal simulation or a monitoring means, such as a monitoring process or system.

Similar monitoring means are e.g. described in WO 2018/189301 A1.

In an embodiment, the irradiation of the manufacturing plane is carried out for preheating the base material.

In an embodiment, the irradiation of the manufacturing plane is carried out for post-heating of the base material or, as the case may be, a solidified structure of the component.

In an embodiment the irradiation of the manufacturing plane is repeated, such as repeated once or several times, prior to and/or after the additive buildup of the component.

According to this embodiment, customised or specific heating cycles or heating ramps may be applied to the overall additive process also in a pre-heating or post-heating step. Thereby, in turn, a structural or compositional quality, such as a hardness, rigidity, thermo-mechanical fatigue or high cycle-fatigue behaviour, may be improved for the final component.

The latter advantages do not only apply for this embodiment but are rather valid for any embodiment of the present invention.

A further aspect of the present invention relates to a method of additive manufacturing a component comprising the method as described above, wherein the energy beam is a laser or electron beam of or on duty in an additive manufacturing device, wherein the method further comprises additively building up the component under the irradiation parameters for fusing the base material.

A further aspect of the present invention relates to a component manufactured by the method of additive manufacturing as described above.

A further aspect of the present invention relates to a method of providing an irradiation pattern or corresponding dataset comprising said pattern for additive manufacturing. Said method comprises irradiating the manufacturing plane for the heating as described above, wherein the irradiation pattern defines a tool path (e.g. comprising further irradiation parameters) for powder-bed-fusion or powder bed based additive manufacturing, and wherein said irradiation pattern can be processed in an additive manufacturing device. Said processing may relate to e.g. reading in, reading out or executing a CAM-file comprising the irradiation pattern.

A further aspect of the present invention relates to a computer program or computer program product comprising instructions which, when executed by a computer or a data processing device, cause the computer to carry out the steps of irradiating the manufacturing plane as described above. Said computer program product may particularly constitute or comprise the CAM-file as mentioned above, or corresponding program instructions.

In an embodiment, the irradiation of the manufacturing plane is carried out computer-implemented.

Advantages and embodiments relating to the described method for heating, method of additive manufacturing, method of providing the irradiation pattern and/or the described computer program (product) may as well pertain or be valid with regard to the other respective categories and/or the described component.

Further features, expediencies and advantageous embodiments become apparent from the following description of the exemplary embodiments in connection with the Figures.

DETAILED DESCRIPTION OF INVENTION

Figure 1:
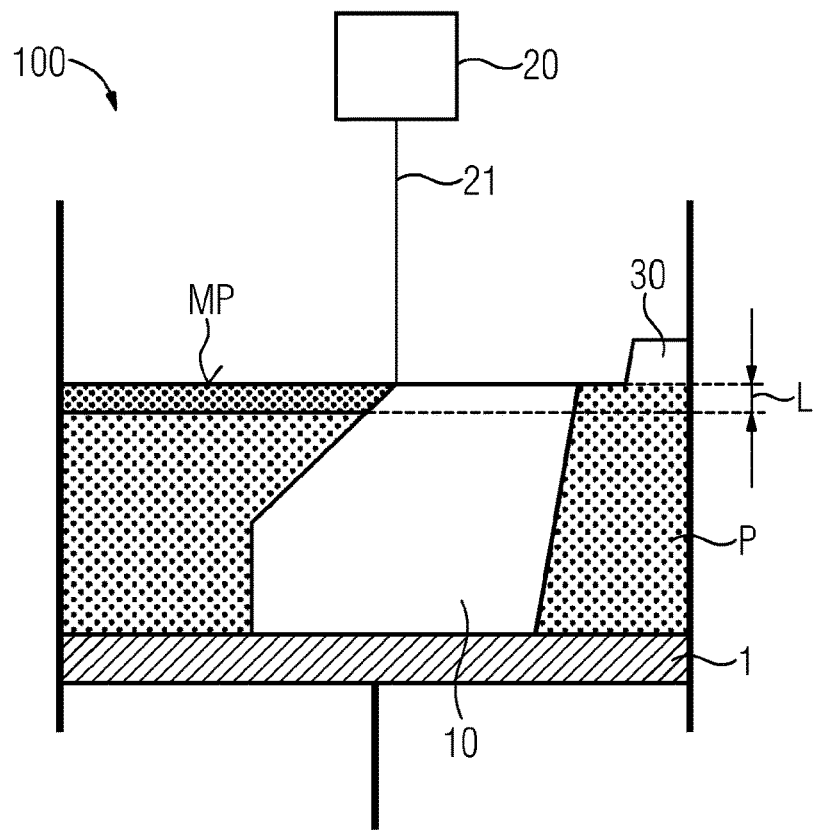
FIG. 1 indicates in a schematic sectional view an additive powder-bed-fusion manufacturing process.

Like elements, elements of the same kind and identically acting elements may be provided with the same reference numerals in the figures. The figures are not necessarily depicted true to scale and may be scaled up or down to allow for a better understanding of the illustrated principles. Rather, the described Figures are to be construed in a broad sense and as a qualitative base which allows a person skilled in the art to apply the presented teaching in a versatile way.

The term "and/or" as used herein shall mean that each of the listed elements may be taken alone or in conjunction with two or more of further listed elements.

FIG. 1 shows an additive manufacturing device 100. Said device 100 is, advantageously, a conventional device for manufacturing any type of components by powder-bed-fusion. Such techniques employ a bed of a powder or base material P which is selectively and layerwise exposed to or irradiated by an energy beam 21, such as a laser or an electron beam of an irradiation apparatus or energy beam source 20. Accordingly, the given powder-bed-fusion method may relate to selective laser sintering, selective laser melting or electron beam melting. Said processes have in common that the component (cf. reference numeral 10) is established or build up on top of a build platform 1. In other words, the component 10 is fused onto said platform 1 and consecutively established by selectively solidifying the base material according to its predefined geometry which may be present in form of a CAD-file. After the irradiation or fusing of each layer (cf. reference numeral L), the build platform 1 is usually lowered according to the measure of a layer thickness and a new base material layer is deposited on a manufacturing plane MP via a deposition apparatus 30.

The component 10 as referred to herein may particularly relate to a steam or gas turbine component, such as component of flow path hardware of a gas turbine. Thus, the component 10 may be or relate to a blade, vane, shroud, shield, such as heat shield, tip, segment, insert, injector, seal, transition, burner, nozzle, strainer, orifice, liner, distributor, dome, boost, cone, lance, plate, resonator, piston or any corresponding retrofit kit. Alternatively, said component may relate to another or similar component.

Figure 2:
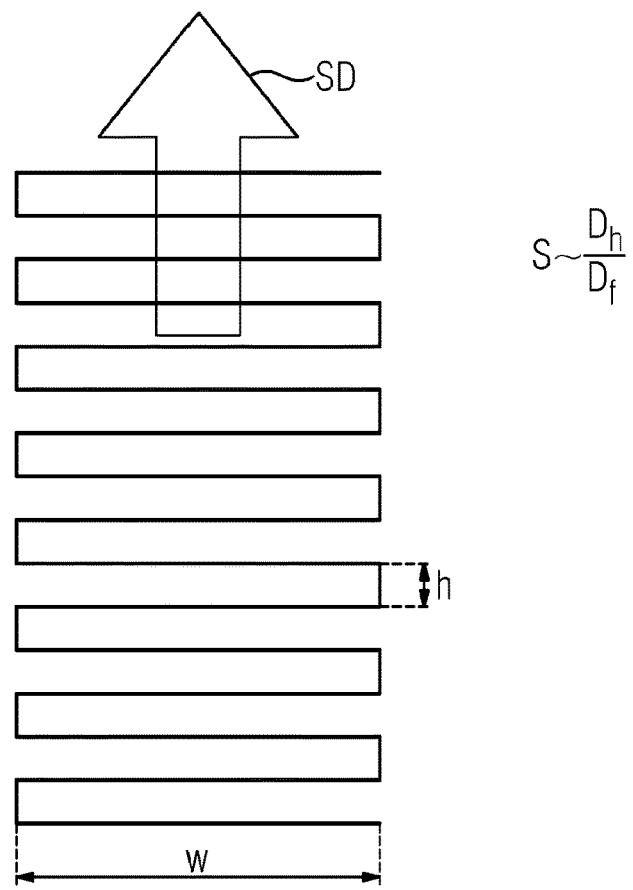
FIG. 2 indicates a simplified irradiation (vector) pattern for heating in additive manufacturing.

FIG. 2 shows in the left part a pattern (cf. reference numerals HP and FP below) according to which a base material P or manufacturing plane MP is irradiated when selective sintering or melting methods are applied. An overall tool path or scanning direction is indicated with arrow SD. This direction SD is modulated by a meander-like pattern or trajectory which shall resemble the path of the corresponding energy beam 21 e.g. for the fusing of the base material.

Said pattern or tool path as shown on the left in FIG. 2 advantageously denotes or defines a fusion pattern or geometric irradiation parameters for fusing the base material MP. The irradiation parameters which may actually define the pattern comprise—inter alia—a hatch distance h and a stripe width w for the irradiation, as indicated on the left. The pattern is a meandering pattern that includes a plurality of parallel stripes and a plurality of turns, where each stripe has a respective stripe width w between consecutive turns and adjacent stripes are spaced apart by the hatch distance h. Such a pattern provides for an expedient solidification result, for which an area-wide irradiation with a focused energy beam is required as possible.

According to the present invention, scaled irradiation parameters or a scaled irradiation pattern is provided which is derived or rendered in that the irradiation parameters for fusing the base material are scaled, such as e.g. multiplied by a scaling factor s as shown on the right in FIG. 2. The scaling factor comprises a quotient of a heating beam diameter Dh and a fusion beam diameter Df (s=Dh/Df). Consequently, said scaling factor s may not be equivalent to said quotient, but may have a further variables or constants affecting the value of the factor s.

The scaling factor s may e.g. amount to values between 1 and 10, such as between 2 and 5. Said scaling factor s may particularly amount to 2, 3, 4 or 5. Alternatively and e.g. depending on the particular heating strategy, said factor may deviate from the given values.

The hatch distance h and/or the stripe width w of the respective irradiation pattern are, according to the present invention, scaled or multiplied by the scaling factor s in order to provide for an expedient heating pattern (cf. FIG. 3 below). By the given scaling, the heating pattern is correlated to the fusing pattern which allows to automatically tailor a heating strategy for or subsequent to the corresponding fusing process.

In addition to the hatch distance h and the stripe width w, the scaling can, according to the present invention, as well apply to further process parameters, such as an energy impact per volume or areal unit, energy wavelength, beam offset, beam speed, geometry of beam spot, beam angle of further ones.

Figure 3:
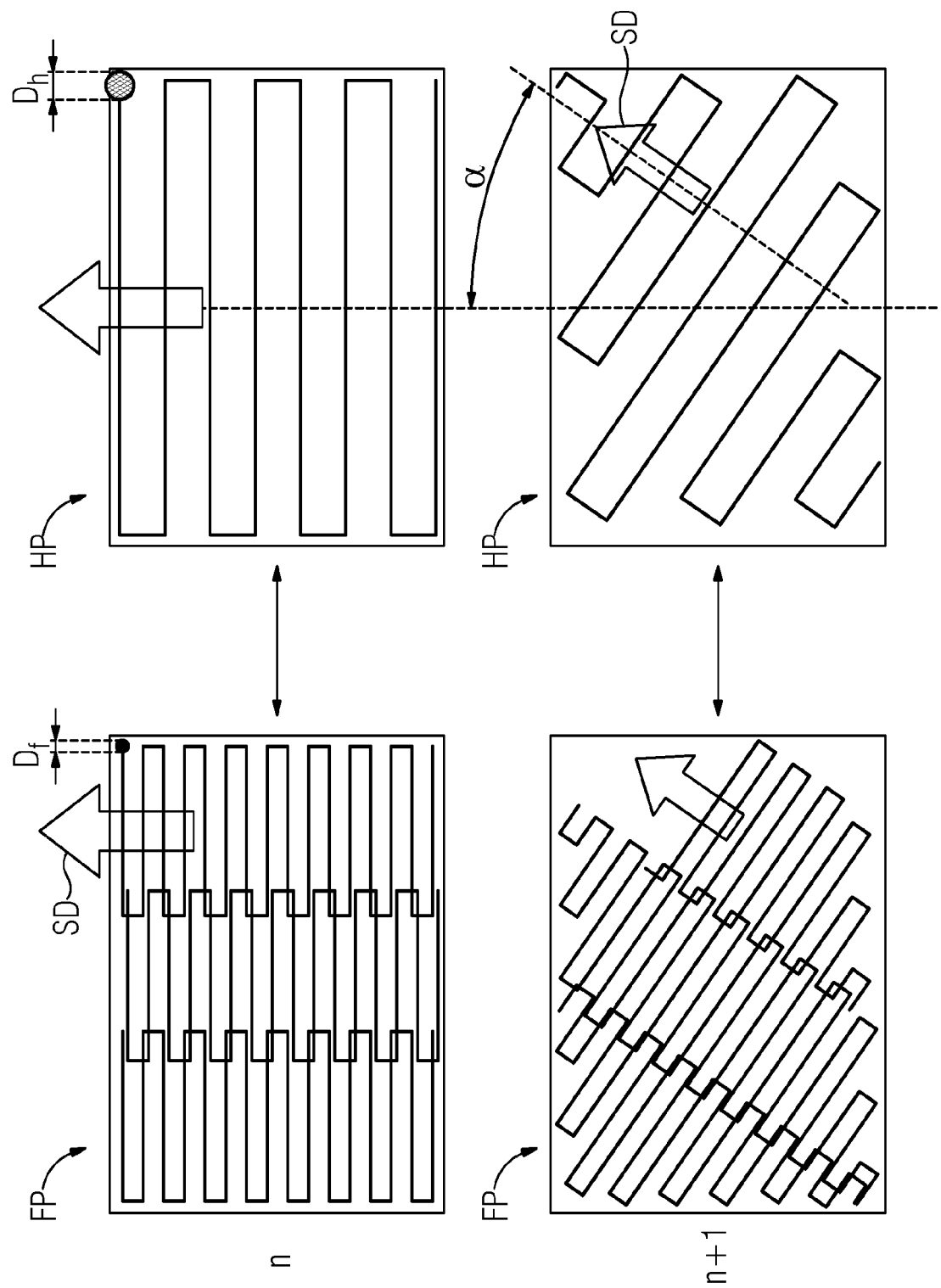
FIG. 3 opposes fusion patterns and heating patterns in schematic illustrations for consecutive layers of a component to be manufactured according to the present invention.

FIG. 3 illustrating aspects of the present invention is composed of four partial images, wherein the upper ones (upper left and upper right) relate to a given layer n in the additive manufacturing process of the component 10; n being a natural number.

The lower images (lower left and lower right) pertain to a subsequent layer n+1 in the additive manufacturing process of the component 10.

For both layers n and n+1, the left part of FIG. 3 shows a fusion pattern FP, while the right part of FIG. 3 indicates in an example a scaled heating pattern HP which was e.g. derived from the respective fusion pattern by the provided scaling strategy.

The upper images of FIG. 3 illustrate that the corresponding scaling factor s by which the hatch distance h and the stripe width w (not explicitly indicated in FIG. 3) are scaled according to the presented method amounts to roughly two (s≈2). The stripe width w is, however, set to infinity (∞) or to a measure corresponding to the width of the manufacturing plane MP, e.g. such that no separate stripe is defined. As shown in the upper images of FIG. 3, both the fusion pattern FP and the heating pattern HP include a plurality of parallel stripes where each stripe has the same stripe width w between consecutive turns and adjacent stripes are spaced apart by the hatch distance h.

This upscaling of the geometry of the heating pattern (originating from a given or set fusion pattern) allows for providing an expedient, efficient and advantageous heating process, be it for pre- or post-heating in additive manufacturing.

In contrast to the corresponding (fusion and heating) patterns for layer n, said patterns for layer n+1, which shall succeed layer n in the manufacturing process, the whole patterns (cf. FP and HP in the lower part of FIG. 3) are tilted by an angle α. This may be expedient or advantageous for the resulting weld structure of the component. When, particularly, the irradiation pattern is tilted or rotated slightly, the weld seam or beads do not exactly overlap in the resulting structure. This in turn improves the heat put into the manufacturing plane MP as well as the structural constitution of the component 10. As shown in the lower images of FIG. 3, both the fusion pattern FP and the heating pattern HP include a plurality of parallel stripes and a plurality of turns where at least two of the stripes have unequal stripe width w between consecutive turns, due to the tilting of the respective fusion pattern FP or heating pattern HP of the layer n by the angle α.

Depending on the actual fusion pattern, the heating pattern may of course be scaled or derived such that also the stripe width w of the heating pattern HP is finite and e.g. chosen twice or 3 times greater than that one of the fusion pattern FP (cf. left part of FIG. 3).

Aside from the described upscaling the heating pattern HP, also a downscaling, e.g. with a value of the scaling factor s of equal to or below 1 (s≤1) are contemplated in the present invention. This particular embodiment may be advantageous particularly when a post-heating shall be carried out e.g. for healing certain defects in the built structure by a dedicated thermal treatment.

The coordinate system in the middle of FIG. 3 indicates spatial directions x and y of a corresponding manufacturing plane (cf. reference numeral MP in FIG. 1).

Figure 4:
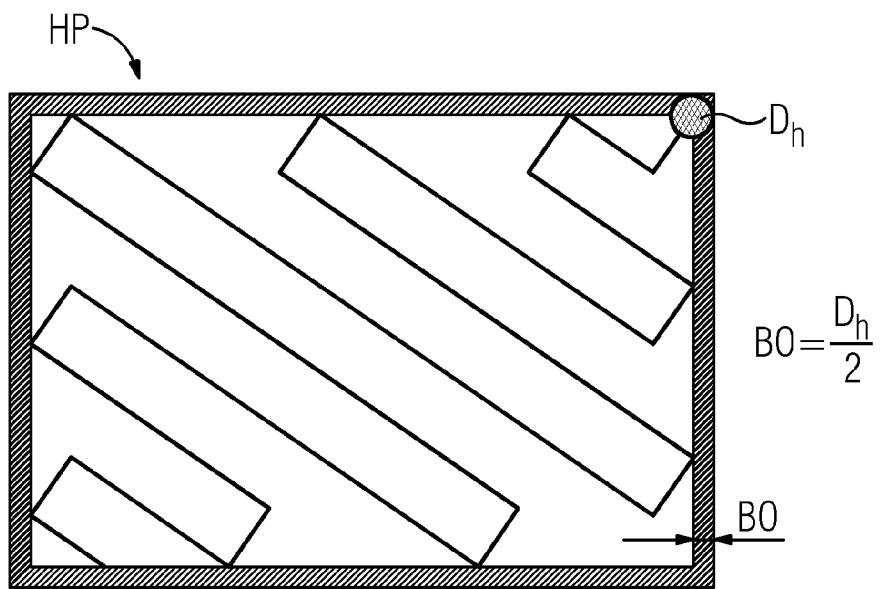
FIG. 4 indicates a simplified irradiation pattern according to another embodiment.

FIG. 4 illustrates in a schematic comparable to the ones of FIGS. 2 and 3 an embodiment of the heating pattern HP which may, according to the present invention, be applied to a pre-heating as well as to a post-heating for additive manufacturing (cf. above).

It is shown in FIG. 4 that—similar to known fusion patterns or corresponding tool path's—a beam offset BO as an irradiation parameter can be defined. A default value can e.g. be set to half of a defocused beam diameter or heating beam diameter Dh (cf. side of FIG. 4). By way of this example, it is illustrated that important aspects of a fusion irradiation strategy can be transferred to a corresponding heating strategy. As stressed above, on one side, the heating, such as pre- or post-heating, can be significantly improved. On the other hand, the overall additive manufacturing process chain, comprising computer-aided-manufacturing (CAM) means are improved or at least implemented in a more automated, efficient and/or reliable way.

Figure 5:
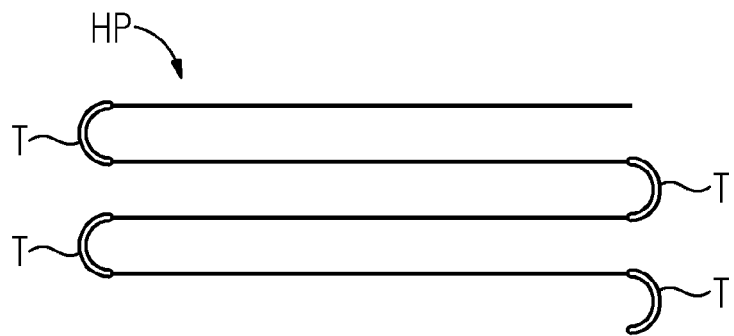
FIGS. 5 and 6 indicate a simplified irradiation pattern for still further embodiments.
Figure 6:
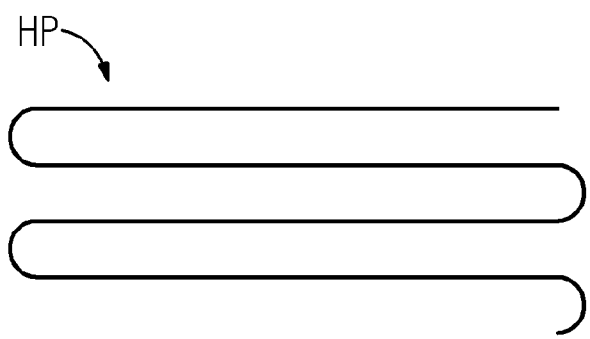

FIGS. 5 and 6 each indicate partial views of heating patterns HP as described above. Further, it is shown that an idle or spare mode operation can be selected for (vector) turns T in the irradiation or heating pattern HP according to the present invention. Said idle or spare mode operation may comprise definition of an idle time, such as a beam-off time which results in a reduction energy applied at the turns T.

FIG. 5 indicates that such a functionality may be carried out according to a "skywriting" function which may be applied in the corresponding fusion pattern in order to avoid high or excessive energy input between two hatch vectors, for instance. The boldly indicated turns T shall illustrate that a full idle is defined at the turns T, at which e.g. the energy beam 21 is completely switched off. For the realisation of this embodiment, a specific idle time may be defined. If, however, the power of the energy beam can be controlled reliably and precisely and reduced in the curved U-turn regions, said "skywriting" or (laser-off-)function for preheating can be dispensed with.

Additionally or alternatively the embodiment illustrated in FIG. 6 is contemplated, wherein the irradiation power or power density in the vicinity of the turns T is only reduced to a lower value which also results in the aerial or spatial energy input to be reduced to a compatible extent.

Said selection of the power of power density of the energy beam and/or the idle or beam-off time can be based either on an input from (pre-)heating simulation, e.g. including an x-y-thermographic map of every layer to be manufactured, or on a monitoring means or system which outputs an information on the local temperature distribution in the given layer L.

Figure 7:
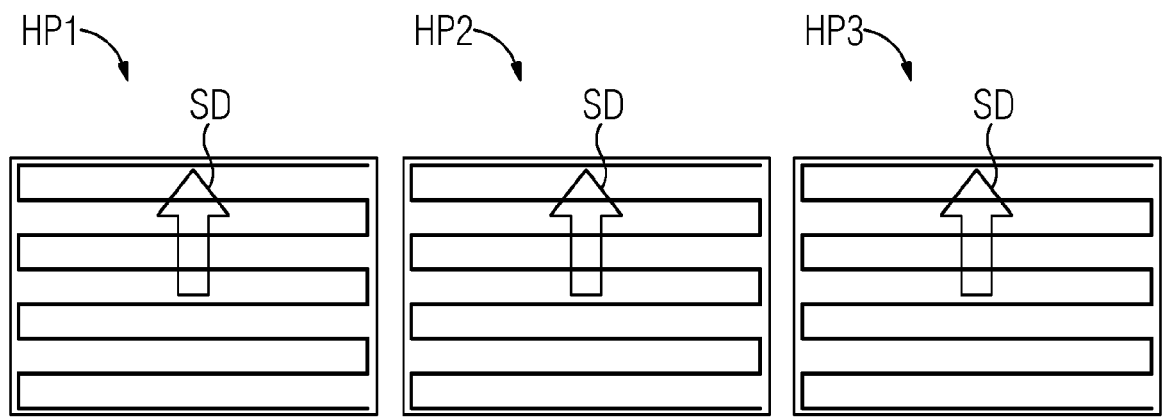
FIG. 7 indicates another embodiment of the presented method of heating according to the present invention.

FIG. 7 indicates a further embodiment of the presented solution, wherein the irradiation of the manufacturing plane MP is repeated, such as repeated once or several times, prior to and/or after an additive buildup of the component 10.

The respective heating patterns HP1, HP2 and HP3 listed from left to right illustrate that any heating exposure or irradiation can be repeated, such as repeated three times. Thereby, further degrees of freedom are provided, by which any heating process can be improved and dedicated to the requirements of the given material and process conditions.

Figure 8:
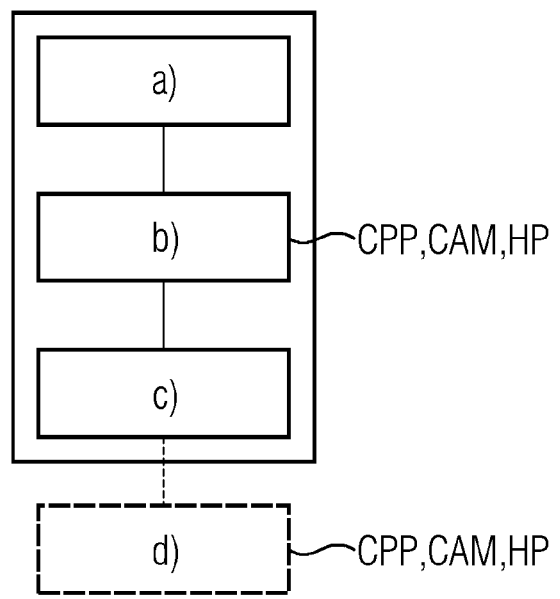
FIG. 8 shows a schematic flow chart of method steps of the present invention.

FIG. 8 further outlines how the presented irradiation solution or a corresponding product is embedded in the overall additive manufacturing process. Some method steps of the present invention are illustrated, wherein step a) denotes providing of the energy beam 21 for the heating of the base material P.

Step b) denotes the presented heating step or as the case may be the irradiating of the manufacturing plane MP for the heating with the energy beam 21 under the scaled irradiation parameters, wherein the scaled irradiation parameters are derived in that irradiation parameters for fusing the base material P are scaled by the scaling factor s, as described above.

Step c) denotes additively building-up the component 10 under the irradiation parameters (cf. fusion patterns FP above) for fusing the base material P. Thus, the given method for heating the base material and/or the manufacturing plane MP is part of the overall additive manufacturing process which may be performed in the additive manufacturing device 100 as shown in FIG. 1.

According to the present invention, step b) may be employed succeeding step a). According to this embodiment, the irradiation or heating is expediently a pre-heating step (cf. above).

Additionally or alternatively, as further shown by way of the dashed contour in FIG. 8, the present invention also contemplates the heating or irradiation of step b) to be succeeding step c). According to this embodiment, the irradiation or heating is expediently a post-heating step (cf. above).

The heating step b) is in either way indicated by the reference numeral CPP for computer program product, and CAM in order to emphasise that the irradiation step may be implemented by a computer or executed or be part of a CAM process or CAM-file.

As stressed above, the present invention further relates to a method of mere providing the irradiation pattern HP, wherein the irradiation is carried out as described above, whereby a tool path for powder-bed-fusion or a corresponding dataset is provided or defined and wherein, the irradiation pattern HP can e.g. be processed in the additive manufacturing device 100. In other words, the technical advantages and the technical solution of the present invention yet manifest in a corresponding computer program, CAM-file or corresponding dataset, which can be processed or executed in any given additive manufacturing device.

The scope of protection of the invention is not limited to the examples given hereinabove. The invention is embodied in each novel characteristic and each combination of characteristics, which particularly includes every combination of any features which are stated in the claims, even if this feature or this combination of features is not explicitly stated in the claims or in the examples.

The invention claimed is:

1. A method of additive manufacturing a component comprising:
   a) providing an energy beam, wherein the energy beam is a laser or electron beam of an additive manufacturing device, and wherein a base material for additive manufacturing is arranged to at least partly form a manufacturing plane,
   b) heating the base material with the energy beam, said heating comprising irradiating the manufacturing plane with the energy beam under scaled irradiation parameters, wherein the heating step b) is different from a fusing step c) and wherein the scaled irradiation parameters for the heating step b) are derived in that irradiation parameters for the fusing step c) separate from the heating step b) are scaled by a scaling factor, wherein the scaling factor comprises a quotient of a heating beam diameter of the energy beam in the heating step b) and a fusion beam diameter of the energy beam in the fusing step c), wherein the irradiation parameters comprise a hatch distance and a stripe width, wherein said hatch distance and said stripe width are scaled by the scaling factor, and
   c) the fusing step comprising irradiating the manufacturing plane with the energy beam under the irradiation parameters for the fusing step c), said fusing step c) comprising additively building up the component under the irradiation parameters for fusing the base material;
   wherein the energy beam is scanned in the heating step b) in a meandering pattern comprising a plurality of parallel stripes and a plurality of turns, wherein each stripe of the parallel stripes has a respective value of the stripe width w between consecutive turns based on the stripe width for the fusing step c) scaled by the scaling factor and wherein each stripe is separated from an adjacent stripe by a respective value of the hatch distance based on the hatch distance for the fusing step c) scaled by the scaling factor.

2. The method according to claim 1, wherein the scaling factor amounts to values between 2 and 5.

3. The method according to claim 1, wherein a beam offset is defined for the irradiation in the heating step b) that is about half of the heating beam diameter.

4. The method according to claim 1, wherein an idle operation is selected for turns in an irradiation pattern resulting from the irradiation of the manufacturing plane.

5. The method according to claim 4, wherein an irradiation power and/or an idle time for the heating step b) is selected based on data, information, or input from a thermal simulation or a monitoring means.

6. The method according to claim 1, wherein the irradiation of the manufacturing plane in the heating step b) is pre-heating that is carried out before the fusing step c).

7. The method according to claim 1, wherein the irradiation of the manufacturing plane is carried out for the heating step b) is post-heating that is carried out after the fusing step c).

8. The method according to claim 1,
wherein the irradiation of the manufacturing plane in steps b) and c) is repeated, once or several times, prior to and/or after an additive buildup of the component.

9. A method of providing an irradiation pattern for additive manufacturing, the method comprising:
irradiating the manufacturing plane for the heating step b) according to claim 1,
wherein the irradiation pattern defines a tool path for powder-bed-fusion additive manufacturing, and wherein said irradiation pattern can be processed in an additive manufacturing device.

10. The method of claim 1, wherein step c) comprises the fusing step including fusing the base material with the energy beam having the fusion beam diameter and with the irradiation parameters for the fusing step.

11. The method of claim 10, wherein step b) is one of:
a pre-heating step performed before the fusing step c); and
a post-heating step performed after the fusing step c).

12. The method of claim 1,
wherein the energy beam in the fusing step c) forms a first fusion pattern in a first layer of the component in the additive manufacturing with the irradiation parameters for the fusing step c); and
wherein the energy beam in the heating step b) forms a first heating pattern in the first layer of the component in the additive manufacturing with the scaled irradiation parameters.

13. The method of claim 12,
wherein the energy beam in the fusing step c) forms a second fusion pattern in a second layer of the component, wherein the second fusion pattern is based on the first fusion pattern tilted by a non-zero angle; and
wherein the energy beam in the heating step b) forms a second heating pattern in the second layer of the component, wherein the second heating pattern is based on the first heating pattern tilted by a non-zero angle.

14. The method of claim 12, wherein the hatch distance for the first heating pattern is greater than the hatch distance for the first fusion pattern.

15. The method of claim 13, wherein:
the first fusion pattern and the first heating pattern each comprise a plurality of parallel stripes and a plurality of turns, wherein each stripe has a same stripe width w between consecutive turns and adjacent stripes are spaced apart by the hatch distance; and
the second fusion pattern and the second heating pattern each comprise a plurality of parallel stripes and a plurality of turns, wherein two or more stripes of each of the second fusion pattern and the second heating pattern have unequal stripe width between consecutive turns.

16. A non-transitory computer readable medium comprising: instructions stored thereon, which, when executed by a computer, cause the computer to carry out the steps of irradiating the manufacturing plane according to claim 1.

17. A method, comprising:
determining irradiation parameters suitable for a fusing step of a base material via an energy beam in an additive manufacturing process, wherein the irradiation parameters for the fusing step comprise a hatch distance and a stripe width;
determining a scaling factor by dividing a heating beam diameter of the energy beam that is suitable for a heating step of the base material during the additive manufacturing process by a fusion beam diameter of the energy beam during the fusing step that is suitable for fusing the base material during the additive manufacturing process, wherein the heating step is separate from the fusing step;
determining scaled irradiation parameters suitable for the heating step of a manufacturing plane of the base material via the energy beam in the additive manufacturing process by scaling the irradiation parameters for the fusing step with the scaling factor, wherein the scaled irradiation parameters for the heating step comprise a scaled hatch distance and a scaled stripe width; and
the heating step of the manufacturing plane with the energy beam using the scaled irradiation parameters for the heating step including scanning the energy beam in a heating pattern comprising a plurality of parallel stripes and a plurality of turns wherein each stripe of the parallel stripes has a respective value of the stripe width between consecutive turns based on the scaled stripe width and wherein each stripe is separated from an adjacent stripe of the plurality of parallel stripes by a respective value of the hatch distance based on the scaled hatch distance.

18. The method of claim 17, further comprising the fusing step of the base material with the energy beam using the irradiation parameters for the fusing step.

19. The method of claim 18, further comprising building up a component by repeatedly performing the fusing step on layers of the base material with the energy beam using the irradiation parameters for the fusing step.

* * * * *